Nov. 9, 1926.

F. L. GODEAU 1,606,361

DEVICE FOR THE CONTROL OF BRAKES

Filed Sept. 27, 1924

Patented Nov. 9, 1926.

1,606,361

UNITED STATES PATENT OFFICE.

FERNAND LOUIS GODEAU, OF GAND, BELGIUM; MADAME VEUVE FERNAND LOUIS GODEAU, NÉE JOSEPHINE ANCIAUX, AND MADAME LEON DE TOLLENAERE, NÉE MARIETTE RAYMONDE GODEAU, EXECUTORS OF SAID FERNAND LOUIS GODEAU, DECEASED, ASSIGNORS TO SOCIÉTÉ ANONYME DU SERVOFREIN DEWANDRE, OF LIEGE, BELGIUM.

DEVICE FOR THE CONTROL OF BRAKES.

Application filed September 27, 1924, Serial No. 740,391, and in Belgium October 11, 1923.

This invention relates to devices for the control of brakes as are utilized in motor cars and the like. It is well known that, especially in the case of vehicles equipped with brakes on all four wheels, the exertion for operating the brakes is a tiring one wherever the motorist has to frequently face the necessity of braking.

Now, the invention has for its object the elimination of this drawback and the obtention of such a device as can mechanically give rise to a fair amount of power at the very moment of operating the brake pedal, with the result of requiring but a small exertion on the part of the motorist to secure a gradual action of the brakes.

To this effect, the present mechanism has been so devised that the mere shifting of either pedal or of brake lever on starting movement of the braking arrangement causes a distributing valve to open or close thus permitting a suction or compression contrivance provided on the vehicle to effect a suction or a pressure inside an auxiliary cylinder equipped with a piston which actuates the brake set of rods, in such a manner that the mechanical strain thus derived is reduced to a more or less considerable portion of the total effort required for braking, and that, as the pedal stroke is coming nearer its end, the motorist has but to exert the additional effort to have the brakes tightly put on as desired.

In the practical execution of such a device, the arrangement can be so designed that the mechanical effort brought about, as soon as the distributing valve is moved, on the pedal or brake lever starting its movement, will be obtainable by one or the other of various methods, say, for instance, by having the auxiliary cylinder connected to the suction side of the vehicle motor, or else, either to the pump for driving on the lubricant, or to any other pump that may be provided on the vehicle, whether acting through gearing, or piston, centrifugal or any other system.

In the description hereinafter given, the invention has been materialized in respect of utilization of the suction deriving from the engine cylinders.

Figure 1:
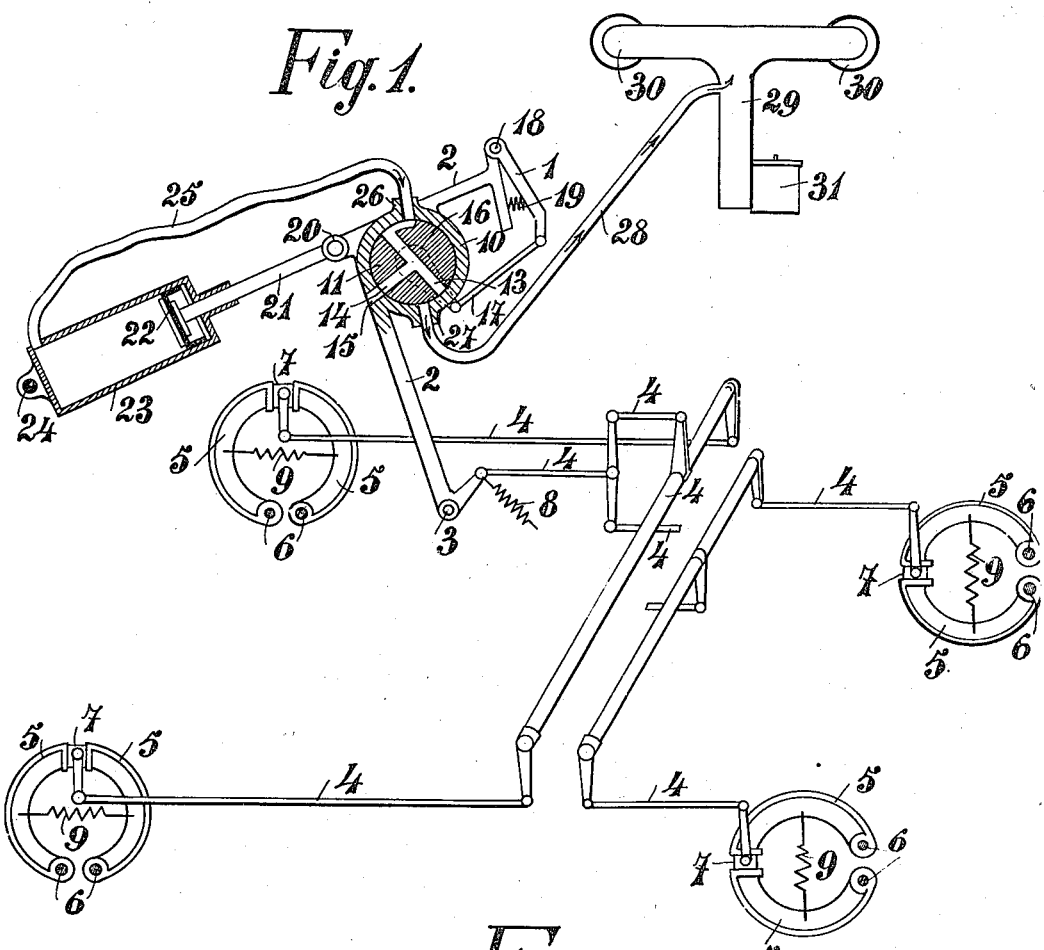
Figure 2:
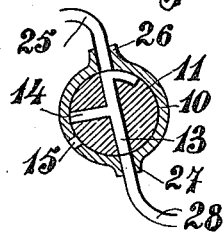

In the accompanying drawings, Fig. 1 is a diagram of the whole arrangement; Fig. 2 showing separately a transverse section of the control valve in its efficient position.

In these drawings, 1 is the control pedal actuating the brakes through interposition of the angular lever 2 capable of swivelling about 3, in cooperation with brake bars 4 serving to put on the brakes 5 on the four wheels in a known manner. In this example, the brake shoes 5 are supposed to swivel on trunnions 6 so as to be applied against the internal periphery of brake pulleys (not shown) whenever the cams 7 provided in each pulley are turned by the set of brake rods 4. After this invention, lever 2 submitted to the reaction of antagonistic spring 8 which acts in cooperation with the ordinary antagonistic springs 9 of the brake shoes 5, is equipped with a valve shell 10 inside which the plug 11 of a three-way cock or valve has a transversal passage 13 as also a canal 14 perpendicular thereto and communicating, whenever the valve is in its normal position, with an orifice 15 of the shell or seat 10.

Plug 11 is connected, through lever 16 and link 17, with pedal 1, which has its swivel at 18 on the end of lever 2, near which it can be brought to come by the compression of a spring 19. On the other hand, lever 2 is linked at 20 to the rod 21 of piston 22, which, in the example shown, can reciprocate inside a cylinder 23 linked at 24 to the chassis; said cylinder is connected, through a pipe 25, with a tubulure 29 coming out from the valve shell 10 whose other side is connected, through tubulure 27 and pipe 28, to pipe 29 inside which the suction is effected by the engine 30 acting to suction air into the carburettor 31. When the parts are in the positions shown in Fig. 1, plug 11 of valve cock 10 is connected through canal 14 with orifice 15, with the result that atmospheric air can penetrate into the valve through 15 and through canal 14, so as to take its way further, through passage 13, into pipe 25 and thence into cylinder 23, thus maintaining piston 22 unnder the action of atmospheric pressure.

In this position, the suction deriving from the engine and then taking its way through pipe 29, only takes place into carburettor 31, pipe 28 being choked in the valve shell 10. When applying the brakes, the car driver, as a result of pressing down the pedal 1, causes latter to oscillate at 18 on the end of lever 2 against the reaction of spring 19. This causes plug 11 of cock 10 to be turned by control lever 16, so that passages 13 and 14 are shifted to position of Fig. 2 in which canal 14 and orifice 15 no longer communicate, while a direct communication of pipes 25 and 28 is secured through passage 13 at that time, therefore the suction deriving from motor 30 will act throughout pipe 29, pipe 28, canal 13 and pipe 25 thus submitting piston 22 to a suction inside cylinder 23. By choosing the right suction for cylinder 23 and piston 22 one can cause such suction to impart to lever 2 any predetermined amount of effort which can turn lever 2 about its fulcrum 3 to be further transmitted to the set of bars 4 so as to reduce by a corresponding amount the exertion required from the driver for lowering the pedal 1 and causing the brakes to be put on; in other terms, assuming the total effort required for braking to be equal to 60 kilos and the effort imparted to piston 22 to be equal to 30 kilos, the driver will but apply a 30 kilos effort on to pedal 1 to have the brake shoes tightly put on.

When ceasing to push down pedal 1 in order to loosen the brakes, the action of spring 19 will bring the pedal back again into position of Fig. 1. Consequently, the valve plug 11 will revert to the position in which passage 14 will correspond to orifice 15, with the result of allowing it to come back into pipe 25 and cylinder 23 thus bringing piston 22 back to the position shown and causing the brakes to be loosened owing to the additional effect of springs 8 and 9.

In the example here above it is assumed that the mechanical strain serving to reduce the effort to be exerted by the driver upon the brake pedal, is effected by the very suction of the vehicle engine. It is, however, quite plain that any other power source capable of a similar action can be utilized. One could, for instance, have the piston driven on by the suction deriving either from the pump which ensures a forced lubrication or from any other pump adapted to the car. In a similar manner, one could have piston 22 actuated by a pressure action instead of a suction, through employment of part of the oil driven on under pressure by the pump, and then allowing the oil to escape into the carrier, on lessening the brakes, through the outlet of a similar cock whose control would be made dependent on that of the cock serving to regulate the introduction of the fluid under pressure into cylinder 23.

In the example herein described, cylinder 23 acts in direct combination with the brake control lever; it should, however, be understood that it could be installed at any other point of the plant, subject only to be capable of acting upon the brake traction rods.

Having now fully described my said invention, what I claim and desire to secure by Letters Patent, is:

1. An operating means for braking mechanism of motor vehicles, including mechanical means to initially and directly operate the braking mechanism, and power means for continuing the operation of the braking mechanism, and means associated with the mechanical means for optionally controlling the power means.

2. An operating means for braking mechanism of motor vehicles including mechanical means for initially and directly operating braking mechanism, a power cylinder for continuing the operation of the braking mechanism, and means associated with the mechanical means for optionally controlling the admission of power to such cylinder.

3. A braking mechanism for motor vehicles, a power cylinder for operating said mechanism, a valve for controlling the admission of power to said cylinder, a brake pedal operative to initially and directly actuate the braking mechanism, and means controlled in the movement of the pedal for governing said valve, whereby the pedal is utilized to start the application of the braking mechanism and to immediately thereafter utilize the power of such cylinder for continuing the brake application.

4. A braking mechanism for motor vehicles, a power cylinder for operating said mechanism, a valve for controlling the admission of power to said cylinder, a brake pedal operative to initially and directly actuate the braking mechanism, and means controlled in the movement of the pedal for governing said valve, said means being at all times under the control of the brake pedal.

5. A braking mechanism for internal combustion motor vehicles, a brake pedal operative for initially and directly actuating the braking mechanism, a vacuum power cylinder for operating subsequently the said mechanism, a connection between internal combustion motor suction pipe and a vacuum power cylinder, a valve for controlling communication of said cylinder with the said suction pipe, and means controlled in the movement of the pedal for governing the said valve, said means being at all times under control of the brake pedal.

6. A braking mechanism for internal combustion motor vehicles, a brake pedal operative for initially and directly actuating the braking mechanism, a vacuum brake cylinder, a piston in said cylinder connected to said braking mechanism and to said pedal for subsequently operating the said mechanism, a valve for controlling the communication between the vacuum brake cylinder and the motor induction pipe and for admission of air to said cylinder for effecting the return stroke of the piston or release the brakes, means with some amount of play for governing the said valve in the movement of the brake pedal, the said means being at all times under control of the brake pedal and of such a nature that the vacuum communication cannot conflict with air admission or permit the admission of air to the induction pipe, except in exhausting the brake cylinder when applying the brakes.

In testimony whereof I affix my signature.

FERNAND LOUIS GODEAU.